July 21, 1953   L. T. McGEE   2,645,866
TRACTOR DIRT HANDLING ATTACHMENT
Filed June 16, 1947   3 Sheets-Sheet 1
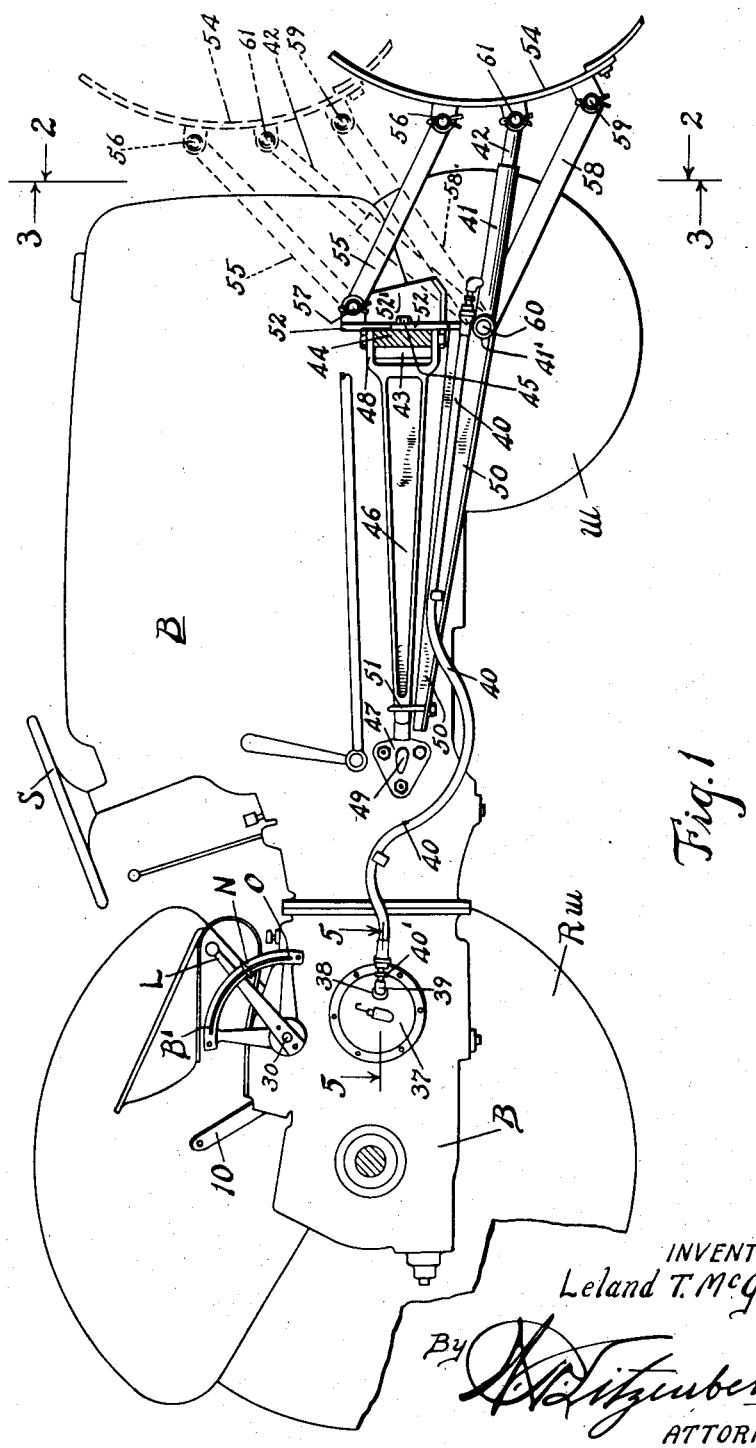
Fig.1
INVENTOR,
Leland T. McGee
ATTORNEY.

July 21, 1953  L. T. McGEE  2,645,866
TRACTOR DIRT HANDLING ATTACHMENT
Filed June 16, 1947  3 Sheets-Sheet 2

INVENTOR,
Leland T. McGee
BY
ATTORNEY.

July 21, 1953 L. T. McGEE 2,645,866
TRACTOR DIRT HANDLING ATTACHMENT
Filed June 16, 1947 3 Sheets-Sheet 3

INVENTOR,
Leland T. McGee
BY
ATTORNEY.

Patented July 21, 1953

2,645,866

UNITED STATES PATENT OFFICE 2,645,866

TRACTOR DIRT HANDLING ATTACHMENT

Leland T. McGee, Los Angeles, Calif.

Application June 16, 1947, Serial No. 754,807

3 Claims. (Cl. 37—144)

My invention relates to tractor dirt handling attachments, and more particularly to improved mechanism for attaching dirt handling tools, or members to a tractor, to be operated thereby, and to be controlled therefrom. One type of dirt handling tool for which my invention is designed is referred to as a bulldozer, although it would be effective in supporting and handling other types of dirt handling tools, or tools for handling other than dirt where the tool is to be pushed into the material to be moved, and can be raised and moved.

Among the salient objects of my invention are: to provide a practical, efficient and economical attachment which can be applied to a tractor for the purpose of making it possible to attach the tool, mechanism or device to said tractor to be moved thereby and operated or controlled therefrom; to provide a simple, practical and successful valve mechanism which can be connected into a flow pipe of the tractor and used for operating the tool or machine to be attached thereto from the regular hydraulic power means thereof; to provide an attachment mechanism for tractors and by means of which a tool, or other attachment can be connected with the tractor and operated therefrom by a simple one way application of the hydraulic power thereto, said tool or other mechanism returning to its down or normal position by gravity.

In order to explain my invention more in detail, I have shown on the accompanying three sheets of drawings, a tractor with a bulldozer attached to and operated thereby, and embodying my invention.

Figure 1 is a side elevation of a tractor, showing a bulldozer attached to the front end thereof and in operating position in full lines and in raised or inoperative position in light broken lines;

Referring in detail to the drawings, I have shown in outline the general body of a tractor designated B, with the usual steering wheel S, front wheels W, W, rear wheels Rw, Rw, hydraulic control lever L, movable from forward, or operating position O, to middle, or neutral position N, or to bleeder or inoperative position B', in the usual and well known manner.

Figure 6:
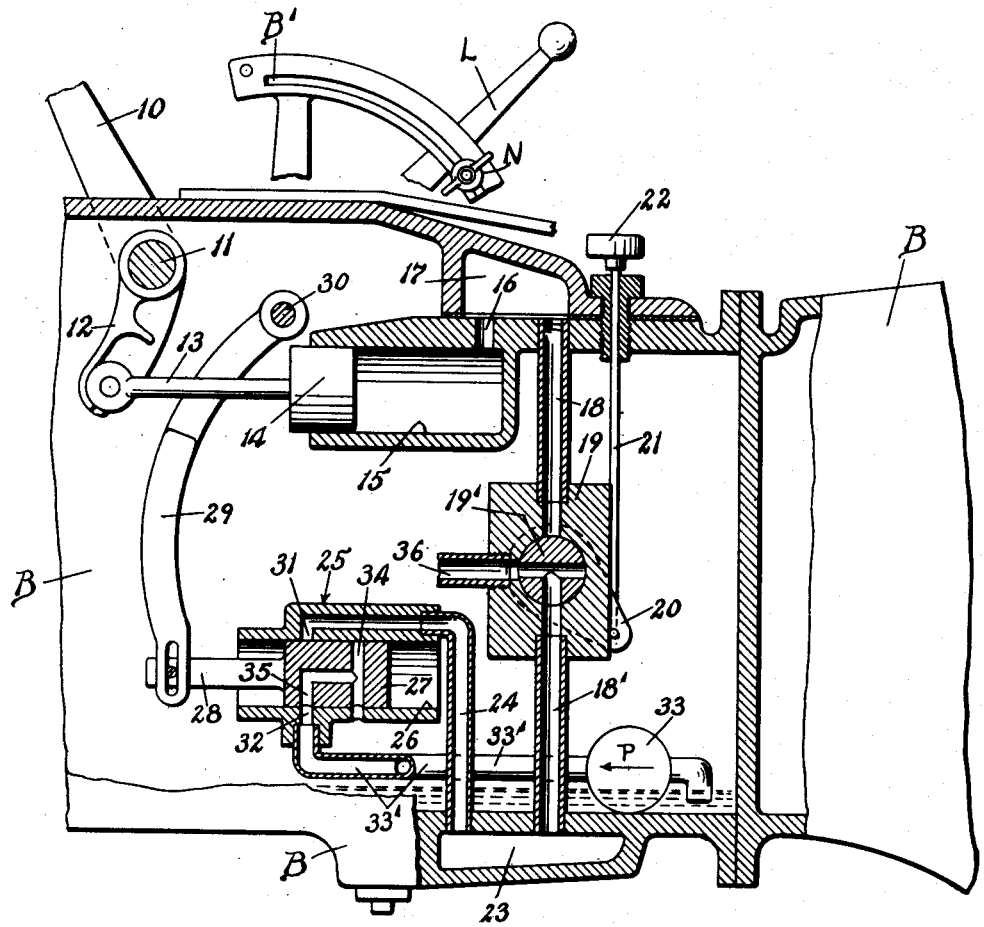
Figure 6 is a sectional view at the control of the tractor, showing how my adaptor valve is connected into the regular hydraulic system of the tractor.

On the tractor is an operating lever 10, hydraulically operated for the purpose of lifting or moving implements or other mechanisms in the rear of the tractor and which may be attached thereto, in a manner well known. This lever is pivoted at 11 and its lower end 12 is pivotally connected with a piston rod 13, from a piston 14, in a cylinder 15, the inner end of which is connected by a port 16, with a chamber 17, which is, in turn connected with a pipe 18, connected with a three-way valve 19, having an operating lever 20, connected with a pull rod 21, and a handle 22, at the top of the tractor, as indicated in Fig. 6. A pipe 18' from said three-way valve 19 connects with a chamber 23 in the bottom of the body, from which extends pipe 24, connected at its upper end with another valve mechanism for controllingg and directing oil flow, said mechanism being designated, as a whole, 25, and includes a cylinder 26, with piston 27 moving therein, and having a piston rod 28 connected with a lever 29, on shaft 30, and operated by the control lever L, before referred to.

The cylinder body 25 has the port 31, fed from the pipe 24, and has the inlet port 32 in its bottom, connected with a pump 33, connecting said valve mechanism 25 with the oil chamber of the body B.

The valve member 27, in said cylinder 26, has a port 34 therethrough, and an angle port 35 connected therewith and extended out through the side of said valve, as clearly shown in Fig. 6.

When said valve member 27 is in the position shown, the operating lever L is in neutral position, and oil from pump 33 through pipe 33' communicates with the angle port 35 and out through port 34 into the oil chamber from which it was pumped. The oil in pipe 24, chamber 23 and pipes 18 and 18' through the three-way valve 19, chamber 17 and cylinder 15 is locked and all parts are held in their stopped position, and said lifting lever 10 is held in its raised position, as indicated.

If the operating lever L were pulled back to the bleeder or inoperative position B', the valve member 27 would be moved inwardly in the cylinder 26, and then the oil from pipe 24 and port 31 would simply flow out of the end of the cylinder 26 and into the oil chamber, and the oil from the cylinder 15, chamber 17 would flow through the pipe 18—18' and to chamber 23 and out through pipe 24. In other words, all the oil is free to flow back into the oil chamber, assuming, of course, that the three-way valve 19 is turned to connect the pipes 18—18'.

In the conventional tractor, pipes 18 and 18' are one straight pipe, without the three-way valve 19 therein.

Applicant, in order to adapt the hydraulic mechanism of the tractor for use in operating his bulldozer mechanism, to be described, has inserted the three-way valve 19 in said pipes 18—18', and has provided the supply pipe 36, which is to be connected with the cylinder which operates his bulldozer, again referred to.

Figure 5:
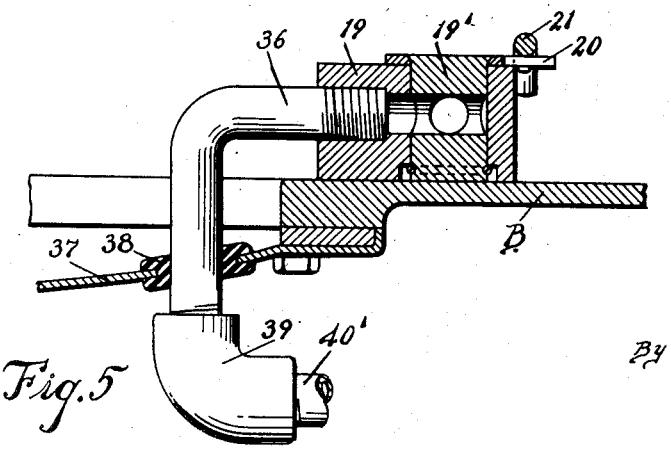
Figure 5 is a detail, partly in section, taken on the line 5—5, of Fig. 1.

Referring to Fig. 5, said three-way valve is shown in horizontal section, and said pipe 36 is shown to be an elbow or angle pipe and extended through an opening made in the case inspection cover 37, with a grommet 38 in the opening, as seen in Fig. 5, and said angle pipe 36 is connected with an elbow 39 and to the pipe or tube 40, which carries the hydraulic fluid or oil to the operating cylinder, designated 41, and seen in Fig. 1. Said tube is connected by suitable coupling, as at 40', with said elbow 39.

Thus by operation of the three-way valve 19' to the position shown in full lines in Fig. 6 hydraulic fluid from the pump 33 can be pumped through pipe 36 and through the tube 40 to the cylinder 41. This assumes, of course, that the control lever L has been moved forward to the operating position O, and valve member 27 has been pulled back to register the port 34 with the ports 31 and 32, when said fluid is pumped through pipe 24, chamber 23, pipe 19' and through the valve 19' to pipe 36, and thence to the operating cylinder, to force its cylinder or plunger 42 outwardly, in a manner understood.

I will now describe my dirt handling attachment mechanism, using a form of bulldozer as the particular attachment used for this purpose.

Figure 2:
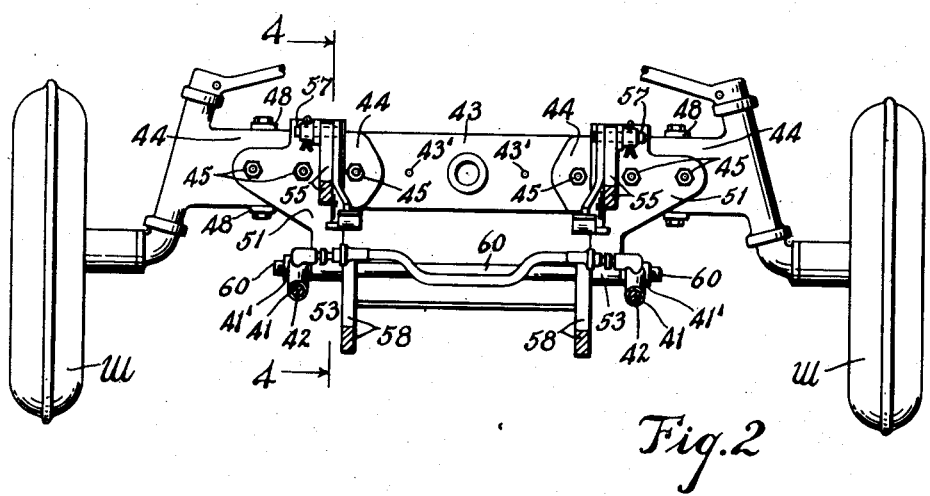
Figure 2 is a fragmentary view taken on the section line 2—2 of Fig. 1, with parts omitted for clearness.

Referring first to Fig. 2, I have shown the front end of the tractor, in section and with parts omitted for clearness. The main axle of the tractor is a three piece member, including the middle section 43, having bolted thereto, at each end, end members, as 44, 44, which carry the front wheels in the manner indicated and which is no part of this invention. The middle section 43 of said axle is provided with holes 43', 43', for adjustment purposes to shorten the axle by moving the end members 44, 44, inwardly, and securing them with the bolts 45.

The long arm members 46 are a part of the conventional tractor, and have a ball and socket connection, as at 47, with a U-shaped end 48, to fit over the axle end members 44, 44, as seen in Figs. 1 and 2. It will be understood that there is one of these arms on each side of the tractor. The part 49, at the ball and socket member 47, is a foot rest.

Figure 4:
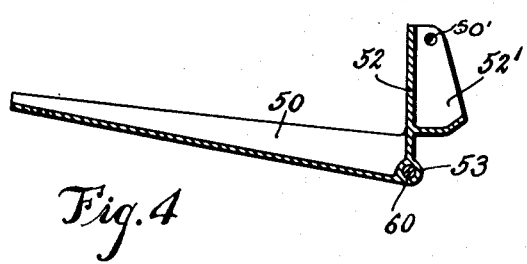
Figure 4 is a detail, in section, on line 4—4 of Fig. 2, showing gone of the main attaching castings.

Applicant provides two special connecting and supporting arms or members, as 50, seen in section in Fig. 4, and seen in place in Fig. 1. The side wheels, front and back are removed from this view to give clear disclosure of the parts involved. The small end of said arms 50 are held by means of a U-shaped bolt 51, to the small end of the member 46, as seen in Fig. 1. This connection permits of limited play or looseness, as required. The large end of said arm or member 50, has an attaching plate portion 52, from which is an angle portion 52', with the necessary bolt holes as 50', and with a bearing, as 53 in its lower end or corner, as indicated.

This connecting and supporting arm or member, at each side of the tractor front, as indicated, constitutes the supporting means from which the bulldozer member or pusher 54 is pivotally supported for raising and lowering. Upper arms, as 55, 55, are pivotally connected to the back of said member 54, as at 56, 56, and to the member 52', as at 57, 57. Lower arms, as 58, 58, are pivotally connected to the back of the member 54, as at 59, 59, and to the member 50 by means of a shaft 60, in the bearings 53, 53 in said side members 50, 50, as seen in Fig. 2.

Figure 3:
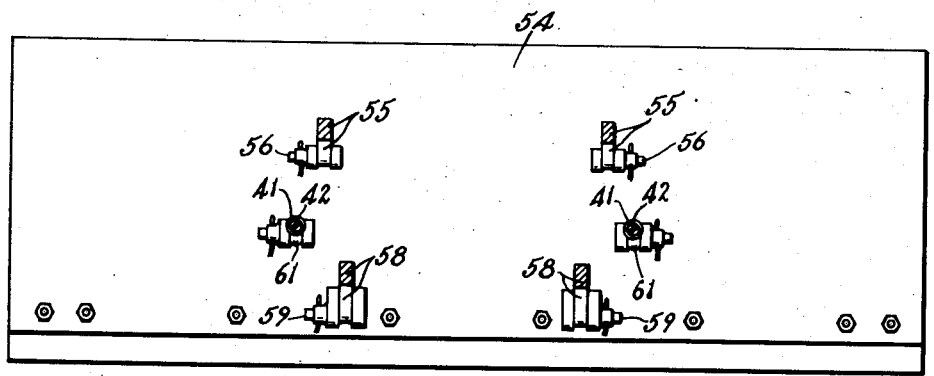
Figure 3 is a sectional view taken on the same line but looking in the opposite direction, as indicated by the arrows.

The cylinders 41, 41, are pivotally connected with said shaft 60, as at 41', 41', and have their pistons or plungers 42, 42, connected to the back of said bulldozer member 54, as at 61, 61, between the upper arms 55, and the lower arms 58, as indicated in Fig. 3, where said arms and connections are shown in a sectional view taken on the line 3—3, of Fig. 1.

By reason of these various arms, pivotally supporting the bulldozer, it will be seen by the light broken line position how it can be raised when hydraulic fluid is forced into the cylinders 41, 41, at opposite sides of the tractor, and it will be understood that when the control lever L is moved to the neutral position, as seen in full lines, that the fluid is locked and the bulldozer is held in this position. When said control lever is moved to the bleeding or inoperative position B' said bulldozer will settle by its own weight and force the oil or fluid back to the oil chamber through tube 40, pipe 36, three-way valve 19', to chamber 23 and thence through pipe 24 to the open end of the cylinder 26, as before described, when the valve member 27 is moved inwardly to the right in Fig. 6.

The lower end of the angle plate 52', extended from the plate 52, serves as an upper stop for the lower arm 58, which supports the bulldozer 54, as will be clear from the dotted line position seen in Fig. 1. It will be understood, of course, that there is one of these arms or members 50 at each side of the tractor, as before explained.

I have shown on the accompanying drawings a preferred form of means for attaching and operating a bulldozer, or any other kind of implement which can be attached to and operated from a tractor, but intend that any kind of suitable head or attaching member having the pivot bearings required for such attachment shall be included as a part of my invention, for there are many implements or tools which are operated by being pushed and raised and lowered which can be connected with and operated in the same manner, and I do not, therefore, limit my invention to the specific use, or to the specific details of construction and arrangement shown for explanatory purposes, except as I may be limited by the hereto appended claims.

I claim:

1. The combination with a tractor having hydraulic power means as a part thereof, and having a front axle member with front wheels carried at the opposite ends thereof, and a bulldozer member in front of said tractor to be raised and lowered, of two connecting and supporting arms at the opposite outer ends of said axle member, and extended rearwardly along the opposite sides of said tractor body, each of said arms having at its forward end an attaching plate portion having upper and lower pivot connections, two pairs of upper and lower short arms pivotally connected to the back of said bulldozer member at their forward ends, one above the other and toward the opposite ends of said bulldozer member, and pivotally connected at their rearward ends to said upper and lower pivot connections on the forward end of each of said attaching plate portions, and a hydraulic cylinder pivotally connected at its rearward end with its pivot axis in alinement with the axis of said lower pivot connection on said attaching plate portion and having an operating plunger therein with its outer end pivotally connected with the back of said bulldozer member between the connections of each pair of short arms, whereby thrust pressure from said plunger on said bulldozer causes it to be raised.

2. A mechanism as set forth in claim 1 in which the two connecting and supporting arms at the opposite ends of the axle member have their rearward ends connected so as to permit slight up and down movement as pressure is applied to their front ends.

3. A mechanism as set forth in claim 1 in which the attaching plate portions of the connecting and supporting arms each has an angle portion to serve as a stop for the lower short arm at each side.

LELAND T. McGEE.

References Cited in the file of this patent

UNITED STATES PATENTS

| Number    | Name          | Date          |
|-----------|---------------|---------------|
| 2,001,803 | Stephens      | May 21, 1935  |
| 2,121,960 | Frink         | June 28, 1938 |
| 2,133,549 | Le Bleu       | Oct. 18, 1938 |
| 2,228,490 | Smith         | Jan. 14, 1941 |
| 2,348,899 | Giugnard et al. | May 16, 1944 |
| 2,391,224 | Carter        | Dec. 18, 1945 |
| 2,404,759 | Washbond      | July 23, 1946 |
| 2,446,136 | Jarmin        | July 27, 1948 |
| 2,559,816 | Alexander     | July 10, 1951 |